(12) United States Patent  (10) Patent No.: US 8,601,289 B1
Smith et al.  (45) Date of Patent: Dec. 3, 2013

(54) OPTICAL NETWORK UNIT WITH REDUNDANT REVERSE POWERING FROM CUSTOMER PREMISES EQUIPMENT

(75) Inventors: Brian C. Smith, Madison, AL (US); Steven M. Robinson, Madison, AL (US); Daniel M. Joffe, Owens Crossroads, AL (US)

(73) Assignee: Adtran, Inc., Huntsville, AL (US)

( * ) Notice: Subject to any disclaimer, the term of this patent is extended or adjusted under 35 U.S.C. 154(b) by 468 days.

(21) Appl. No.: 13/031,323

(22) Filed: Feb. 21, 2011

(51) Int. Cl.
*G06F 1/26* (2006.01)

(52) U.S. Cl.
USPC .......................................... 713/300; 713/340

(58) Field of Classification Search
None
See application file for complete search history.

(56) References Cited

U.S. PATENT DOCUMENTS

| | | | |
|---|---|---|---|
| 5,469,282 A | 11/1995 | Ishioka | 359/110 |
| 5,664,002 A | 9/1997 | Skinner, Sr. | 379/56.2 |
| 6,459,175 B1 * | 10/2002 | Potega | 307/149 |
| 6,567,195 B1 | 5/2003 | Ford et al. | 359/118 |
| 6,626,586 B1 | 9/2003 | Jaeger | 398/5 |
| 7,116,761 B2 | 10/2006 | Ashton et al. | 379/56.2 |
| 7,379,542 B2 | 5/2008 | Jackson | 379/102.04 |
| 7,596,801 B2 | 9/2009 | Wall et al. | 725/129 |
| 7,672,591 B2 | 3/2010 | Soto et al. | 398/72 |
| 2011/0064212 A1 * | 3/2011 | Cooper et al. | 379/307 |

* cited by examiner

*Primary Examiner* — Dennis M Butler
(74) *Attorney, Agent, or Firm* — Fish & Richardson P.C.

(57) ABSTRACT

In accordance with a non-limiting example, an optical communications system includes a plurality of Customer Premises Equipment (CPE), each having a reverse power supply circuit and each connected to a wire pair and configured to transmit and receive data and provide reverse power over the wire pair. An Optical Network Unit (ONU) includes a plurality of communication boards. A respective communication port is connected to a selected wire pair and its associated CPE through which data is transmitted and received and power received therefrom. A power management circuit is connected to each of the communication ports and configured to receive power and provide power sharing and manage power consumption and power supply redundancy from the plurality of CPE through the communication ports.

22 Claims, 6 Drawing Sheets

OPTICAL NETWORK UNIT WITH REDUNDANT REVERSE POWERING FROM CUSTOMER PREMISES EQUIPMENT

FIELD OF THE INVENTION

The present invention relates to communications systems, and more particularly, this invention relates to powering an Optical Network Unit (ONU).

BACKGROUND OF THE INVENTION

Current fiber fed Optical Network Unit (ONU) type telecommunications systems require expensive to install and maintain power rectifiers and AC mains meter and service to power the ONU equipment. Power over Ethernet (PoE) provides single port powering over Ethernet service cables. There are yet other systems where a network element receives power and data over electrical lines from a Customer Premises Equipment (CPE). There is a desire, however, for greater management control and redundancy that is not provided by these types of systems.

SUMMARY OF THE INVENTION

In accordance with a non-limiting example, an optical communications system includes a plurality of Customer Premises Equipment (CPE), each having a reverse power supply circuit and each connected to a wire pair and configured to transmit and receive data and provide back power over the wire pair. An Optical Network Unit (ONU) includes a plurality of communication ports. A respective communication port is connected to a selected wire pair and its associated CPE through which data is transmitted and received and power received therefrom. A power management circuit is connected to each of the communication ports and configured to receive power and provide power sharing and manage power consumption and power supply redundancy from the plurality of CPE through the communication ports.

In one example, each port at the ONU includes a front end power circuit connected to the power management circuit and configured to isolate individual port failures, wire pair shorts and allow normal operating when other ports are functional. Each front end power circuit in one example includes a bridge circuit. In another example, each reverse power supply at a CPE includes a hiccup fault restart circuit connected to the reverse power supply and configured to initiate a power down and power up sequence of a respective reverse power supply when the respective reverse power supply circuit is in a fault condition.

In another example, each reverse power supply at a CPE includes a transient protection device configured to release from its triggered state based on the initiation of the power down and power up sequence.

In another example, the ONU includes an Ethernet switch connected to the plurality of ports and the power management circuit. A processor is connected to the Ethernet switch and configured to switch power consumption from unused and out-of-service communication ports. The processor in one example is configured to receive a dying gasp interrupt indicative that power is failing on a reverse power supply at a CPE. A manager circuit is configured to receive a signal indicative that the processor receives a dying gasp interrupt and discriminate CPE device faults from a removal of power initiated by a customer. In yet another example, the ONU includes an overcurrent protection circuit configured to control in-rush current from the reverse power supply during power up. In another example, each reverse power supply at a CPE includes a power converter circuit configured to convert a supply voltage into an isolated voltage to provide power to the ONU. Each reverse power supply at a CPE includes an active output voltage load line control that ensures equitable load sharing between a plurality of CPE.

BRIEF DESCRIPTION OF THE DRAWINGS

Other objects, features and advantages of the present invention will become apparent from the detailed description of the invention which follows, when considered in light of the accompanying drawings in which.

DETAILED DESCRIPTION OF THE PREFERRED EMBODIMENTS

Different embodiments will now be described more fully hereinafter with reference to the accompanying drawings, in which preferred embodiments are shown. Many different forms can be set forth and described embodiments should not be construed as limited to the embodiments set forth herein. Rather, these embodiments are provided so that this disclosure will be thorough and complete, and will fully convey the scope to those skilled in the art.

Figure 1:
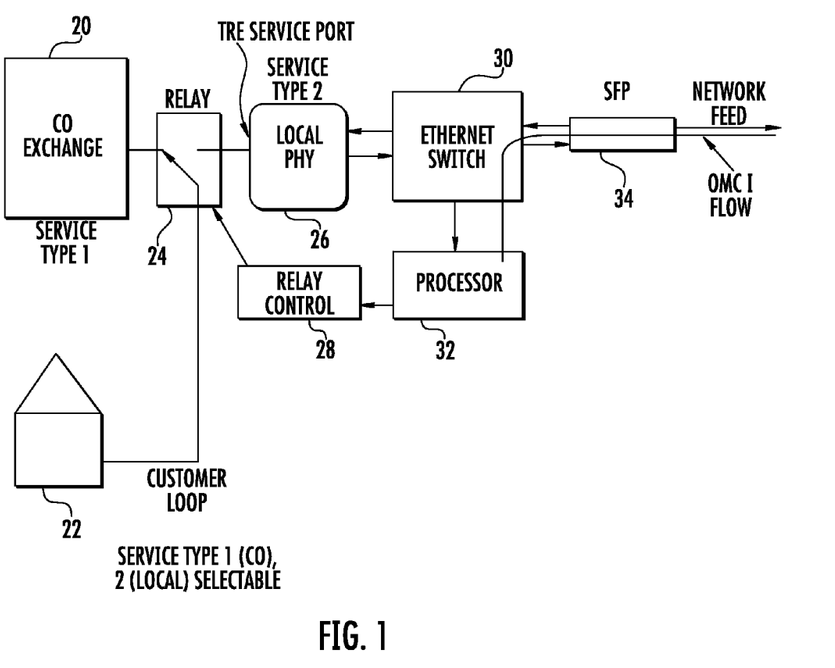
FIG. 1 is a block diagram of a communications system as an example that can incorporate the redundant reverse power system in accordance with a non-limiting example.
Figure 2:
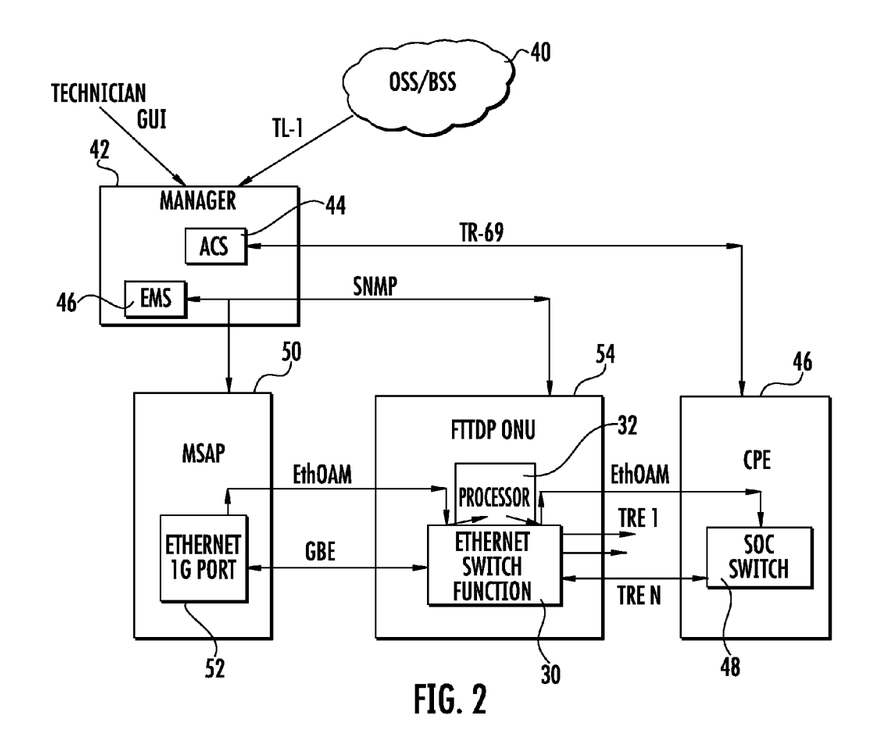
FIG. 2 is another block diagram example of a communications system similar to FIG. 1, but showing other details of a system that can be used and incorporate the redundant reverse power system in accordance with a non-limiting example.

FIGS. 1 and 2 illustrate basic functional components of a communications system that can incorporate the reverse power system as will be described relative to FIGS. 3-6. FIGS. 1 and 2 are described as an example system that can be used and modified in accordance with a non-limiting example. Although the description relative to FIGS. 1 and 2 are described relative to a remotely managed switching element that resides in the ONU, it should be understood that the reverse powered system is used.

In accordance with a non-limiting example, it is possible to use management messages such as SNMP (Simple Network Management Protocol), OMCI (Open Managed Client Instrumentation), or CLI (Call Level Interface) management messages sent from a central office management system to configure a remotely managed switching element in the ONU. These types of messages can also be used in the reverse powered ONU described relative to FIGS. 3-6.

This remotely managed switching element is created in the FTTDP (fiber-to-the-distribution point) ONU and remotely configured by SNMP management messages or OMCI, CLI or similar command messages. This example ONU shows a latching type switching relay that maintains its state without power being applied. Any relay control circuit is under processor control. A switch, for example, an Ethernet switch, routes an SNMP set or CLI or OMCI command message as a relay message to a local processor on the FTTDP ONU over an Ethernet operations and management layer protocol (ETHOAM) message channel, using in one example a VLAN tag identifier. This system includes separate tip/ring port connections that connect to the latching type switching relay and connect the customer loop to a central office (CO) exchange port on a local Extended Reach Ethernet Service data service port (for example, the Total Reach Ethernet/TRE from ADTRAN, INC. of Huntsville, Ala.). Two central office services that could be provided can be any two-wire (or four-wire) type service served from the central office (CO) exchange. These services could include POTS, ADSL, VDSL, ADSL2, VDSL2, SHDSL, ISDN, HDSL4, and similar services. There could also be services from the local ONU device port, e.g., XDSL, VDSL2, ADSL2, POTS, Total Reach Ethernet (TRE) corresponding to an Extended Reach Ethernet Service, and similar services.

In one example, a message is sent via the SNMP database via the ETHOAM flow and selects the state of the relay on each port and is terminated and acted upon by a local processor. Service can be selected to a CO source service, a local TRE port service as a local source service, or disabled by connecting to the local TRE port source and taking the port out of service. In one example, it is possible to use a flash memory device on an ONU board that saves a provisioned relay state during a power failure. This system dynamically controls the physical service port connectivity to a customer premise via a management interface. The system also maintains service port connection states during a power outage and saves latching relay switch states via flash memory storage of SNMP MIB data. It is possible that there is a remotely powered fiber optic device that performs servicing and operates as a smart relay and manages the service. As noted before, the ONU is remotely powered in this example as will be explained in greater detail relative to FIGS. 3-6.

FIG. 1 shows an overall block diagram view of the communications system and showing the central office (CO) exchange 20 as a service type 1 and connected to a customer loop 22 and selectable between the central office exchange and the customer loop using the relay 24. A service type 2 local physical device 26 is connected to the relay by an Extended Reach Ethernet Service port (a TRE service port) in a non-limiting example. A relay control 28 connects to the relay and the local physical device 26 connects to the switch 30, which in this example, is an Ethernet switch. A processor 32 connects to the relay control 28 and Ethernet switch 30 and interoperates with the relay control and the Ethernet switch, which in turn connects to a selectable fiber optic (SFP) module 34 and a network feed 36 for an optical media converter (OMC) data flow.

FIG. 2 shows a block diagram of a basic management model and network architecture. In this example, the illustrated Ethernet switch 30 and processor 32 are the same reference numerals in FIG. 1, otherwise the reference numerals for components shown in FIG. 2 begin in the 40's.

An Operation Support System/Business Support System (OSS/BSS) 40 connects to a central office manager 42 that includes an auto configuration server (ACS) 44 and element management system (EMS) 46 that manages network elements using SNMP. These components could be supplied from ADTRAN, INC. The ACS 44 communicates to at least one customer premises equipment 46 that includes a system-on-chip (SOC) switch 48. Only one CPE is illustrated, but the ONU typically connects to a plurality of CPE's. The EMS 46 communicates with a multi-service access and aggregation platform (MSAP) 50 that could be a Total Access 5000 device from ADTRAN, INC. and includes an Ethernet one gigabit (1 G) port 52 that communicates over ETHOAM with the FTTDP ONU 54, which includes the Ethernet switch 30 and processor 32. The Ethernet 1 G port 52 communicates using gigabit Ethernet (GBE) to the Ethernet switch. The OSS/BSS 40 communicates via a Transaction Language 1 (TL-1) protocol with the ACS 44 in one example. A technician communicates with the central office manager 42 using a graphical user interface (GUI). The ACS communicates to a CPE in this example using TR-069 as an application layer protocol such as CPE WAN Management Protocol (CWMP).

Figure 3:
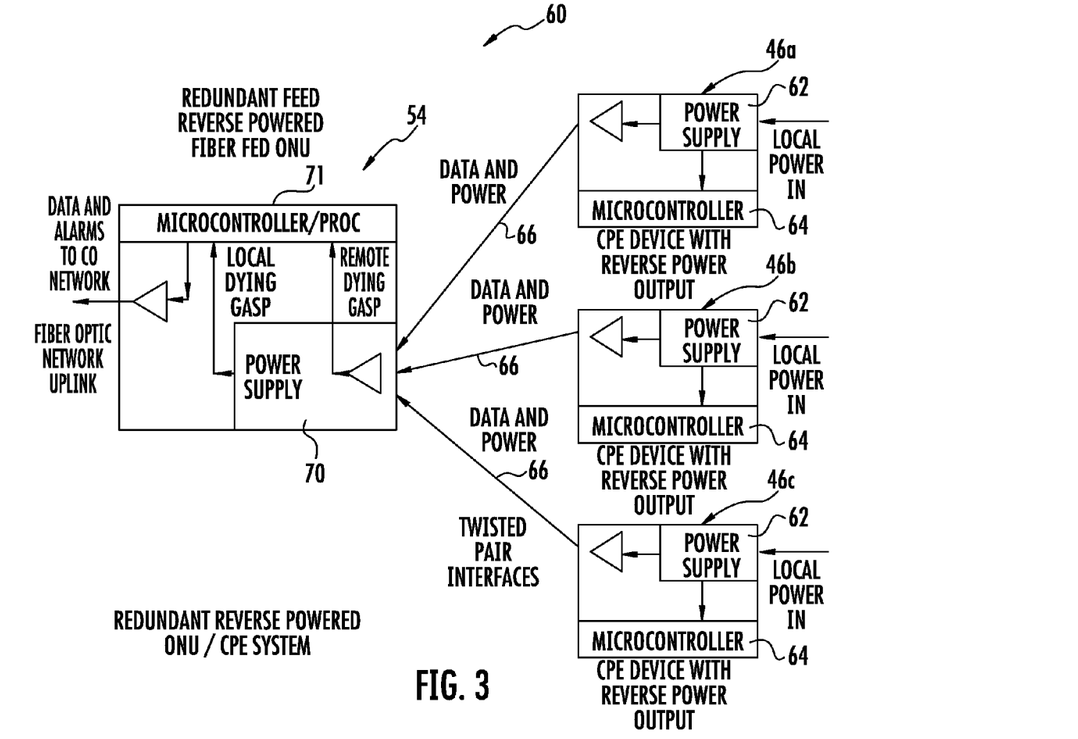
FIG. 3 is a block diagram showing a reverse powered ONU connected to three Customer Premises Equipment (CPE) end point devices that use reverse power supplies in accordance with a non-limiting example.

FIG. 3 illustrates a redundant reverse powered ONU/CPE system illustrated generally at 60, which includes a plurality of Customer Premises Equipment (CPE) shown as three CPE's 46a, 46b, 46c as end point devices each having a reverse power supply circuit 62 that interoperates with its local microcontroller to provide each CPE device with reverse power output. Redundancy is provided as explained below. A data communication channel is shown between each CPE and an ONU over the metallic twisted wire pair 66 as illustrated and the DC voltage is applied to the metallic twisted wire pair from the CPE device to the ONU and used by the remote ONU device to power itself. This provides powering from redundant sources as CPE's and provides telecommunication data services to the end customer at the CPE device. Data is communicated back and forth between each CPE and the ONU. The ONU 54 includes a power supply shown generally by a block diagram at 70, and a power management circuit as explained below that interoperates with a plurality of communication ports and microcontroller 71 or processor. A respective communication port is connected to a selected wire pair and its associated CPE through which data is transmitted and received and power received therefrom. The power management circuit is connected to each of the communication ports and configured to receive power and provide power sharing and manage power consumption and power supply redundancy from the plurality of CPE's through the communication ports. The power supply can initiate a local dying gasp to the microcontroller/processor and a remote dying gasp can be received from a CPE device and provided to the microcontroller/processor.

Figure 4:
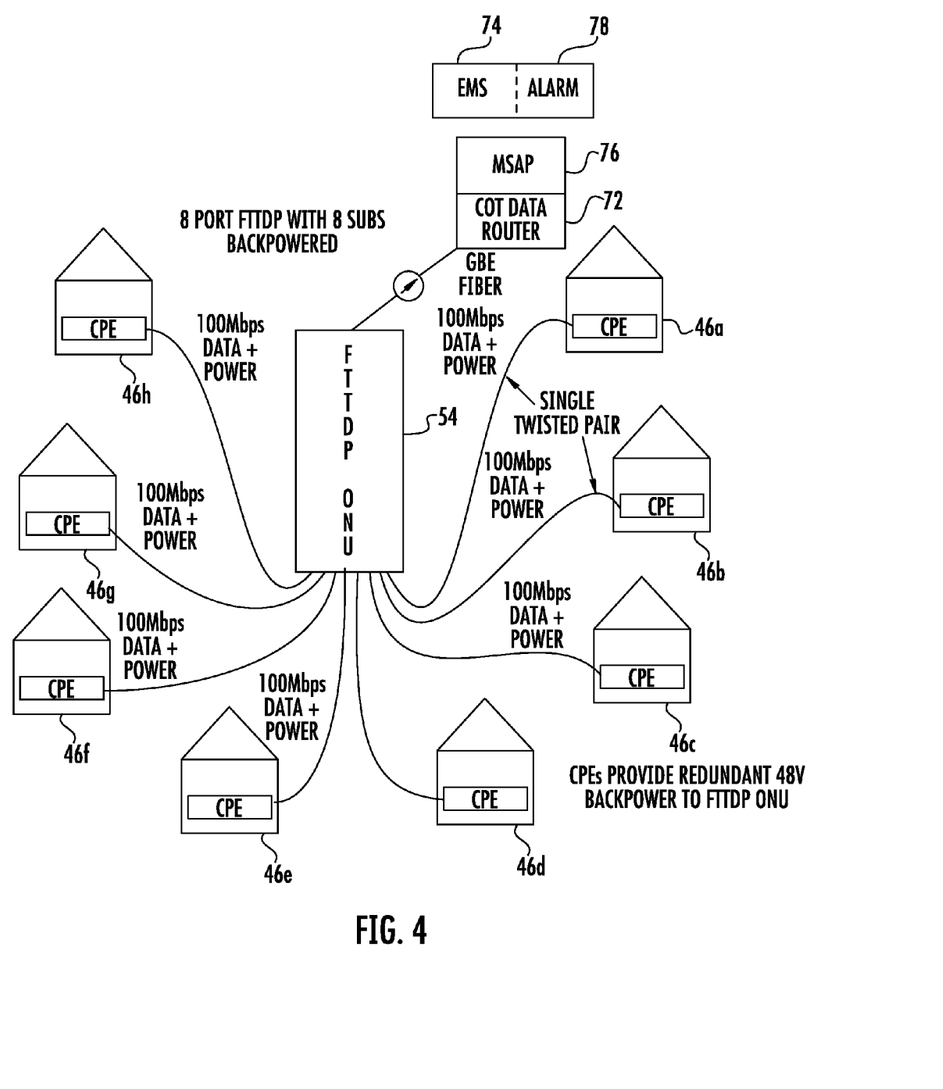
FIG. 4 is a block diagram showing a Fiber-to-the-Distribution Point (FTTDP) ONU and eight connected CPE's in a typical deployment in accordance with a non-limiting example.

FIG. 4 is a system block diagram showing an FTTDP ONU 54 such as shown in FIG. 3 and eight connected CPE's 46a-h in a typical deployment. Each CPE is connected to a port on the ONU and provides at least 100 Mbps bidirectional data service over a single twisted wire pair. Each CPE provides 48 volt power on a pair to reverse power the ONU in a redundant fault tolerant topology. The powering arrangement is termed reverse because the CPE units power the ONU. The ONU can be powered from one CPE while providing service to one CPE connection. If powered from more than one CPE, an ONU can provide service to all of the CPE connections. The ONU is connected to a Central Office Terminal (COT) data router 72 and EMS 74 that can be part of a Multi-Service Access Platform (MSAP) 76 and alarm system 78 that is upstream over a one GBE fiber.

Figure 5:
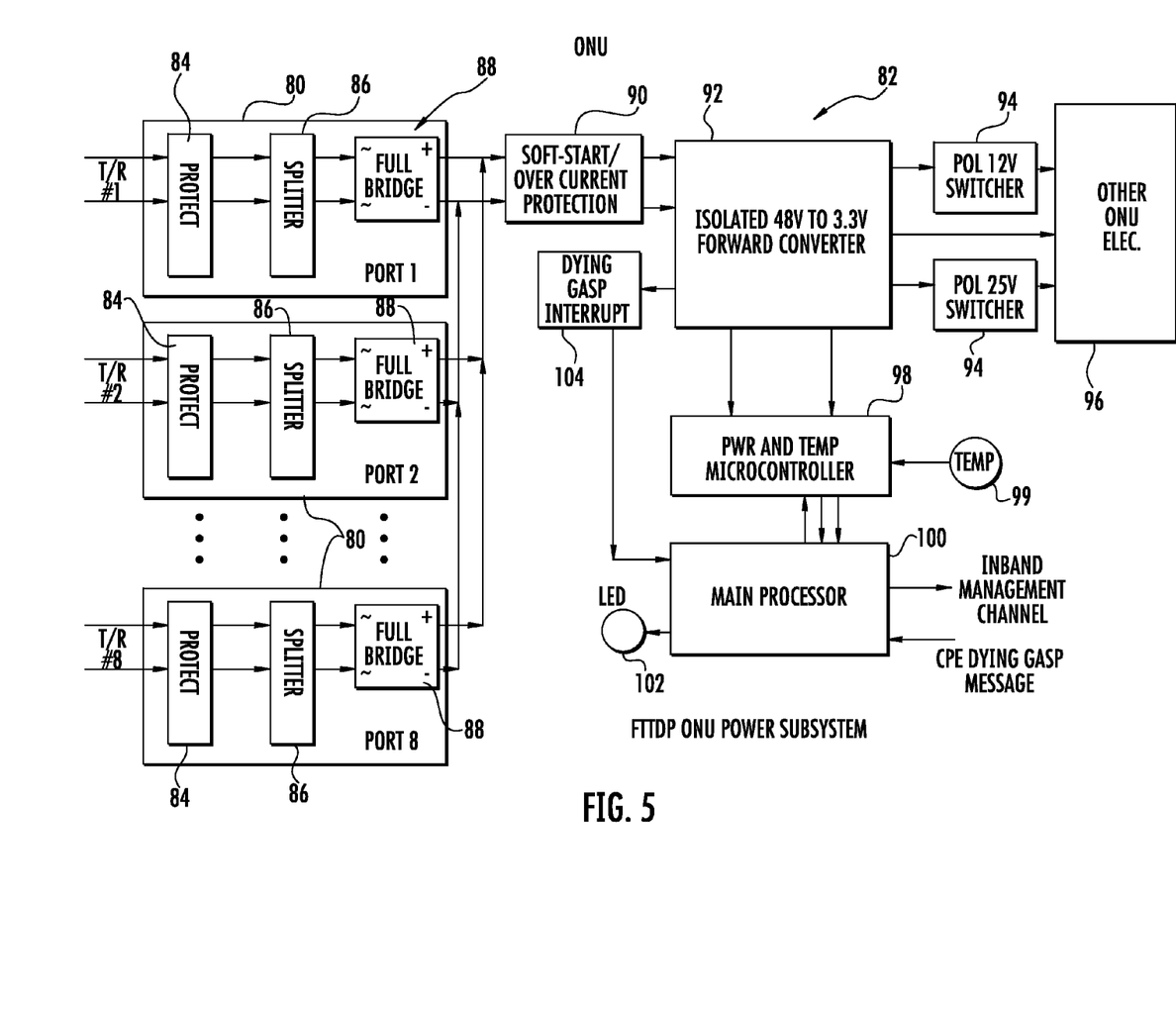
FIG. 5 is a block diagram showing an example of an ONU configured to receive redundant power.

FIG. 5 illustrates a block diagram of an ONU 54 that is reverse powered in accordance with a non-limiting example. As illustrated, the ONU 54 includes a plurality of communication ports 80 illustrated as eight ports shown as port 1 through port 8 and each connected to a selected wire pair shown as T/R #1 through T/R #8 and an associated CPE (not shown in FIG. 5) through which the data is transmitted and received and power received therefrom. A power management circuit 82 is connected to each of the communication ports 80 and configured to receive power and provide power sharing and manage power consumption and power supply redundancy from the plurality of CPE through the communication ports. Each port 80 includes a protection circuit 84 as a secondary protection circuit for a tip/ring interface. Each port also includes a splitter circuit 86, for example, a splitter inductor which isolates the on-board power supply from any high-speed line data interface. Each port at the ONU also includes a front-end power circuit 88 connected to the power management circuit 82 and configured to isolate individual port failures, port pair shorts and allow normal operating when other ports are functional. In an example, the front-end power circuit 88 at each port includes a full bridge circuit that allows tip/ring polarity reversal and provides diode "OR" function to support multiple interface port redundancy.

The power management circuit 82 as a subsystem of the ONU includes an overcurrent protection circuit 90 that is configured to control in-rush current from the reverse power supply at power up. An isolated 48 volt to 3.3 volt power converter circuit 92 operates as a main supply converter for the power supply circuit board (shown generally by dashed lines) and includes many of the ONU power supply components. It provides galvanic isolation from the tip/ring interface to various board electronics.

As further illustrated in FIG. 5, Point-of-Load POL voltage regulator circuits 94 run off an isolated 3.3 volt output of the power converter circuit and provide regulated voltages for the board electronics. Power is supplied to other electronic components 96 as illustrated. A power and temperature microcontroller circuit 98 reads analog voltage and current transducers from the power converter circuit 90 and ambient temperature of the circuit board in an overall ONU or power circuit enclosure and ensures proper operation and provides a management interface with the total power consumption for the unit. This allows management of services based on power consumption. A main processor 100 manages power alarms and provides in-band communication of the ONU to customer premises devices and network side alarms and EMS. It can communicate in one example through an in-band management channel and trigger an LED 102 to signal visibly any alarms. A dying gasp interrupt circuit 104 provides an interrupt to the main processor when power is failing on units. This allows the processor to send messages to a network alarm center for discriminating device faults from "no service" power faults before power fails on a unit. It also allows the processor to shut down in an orderly fashion the Ethernet switch and physical device, for example, as shown in FIGS. 1 and 2, to minimize bad packet generation errors.

A CPE dying gasp message operates over a communications channel from the CPE alerting the ONU of a CPE being powered down. It can be forwarded to a network alarm system 78 and an EMS 74 to discriminate CPE device faults from customer power removal and generate an appropriate alarm. The main processor also provides power management and has software resident on the processor to actively manage power consumption of the unit by disabling physical devices and switch power consumption on unused and out-of-service ports and non-configured interfaces. This stringent power conservation design allows single CPE port powering of the entire ONU.

Figure 6:
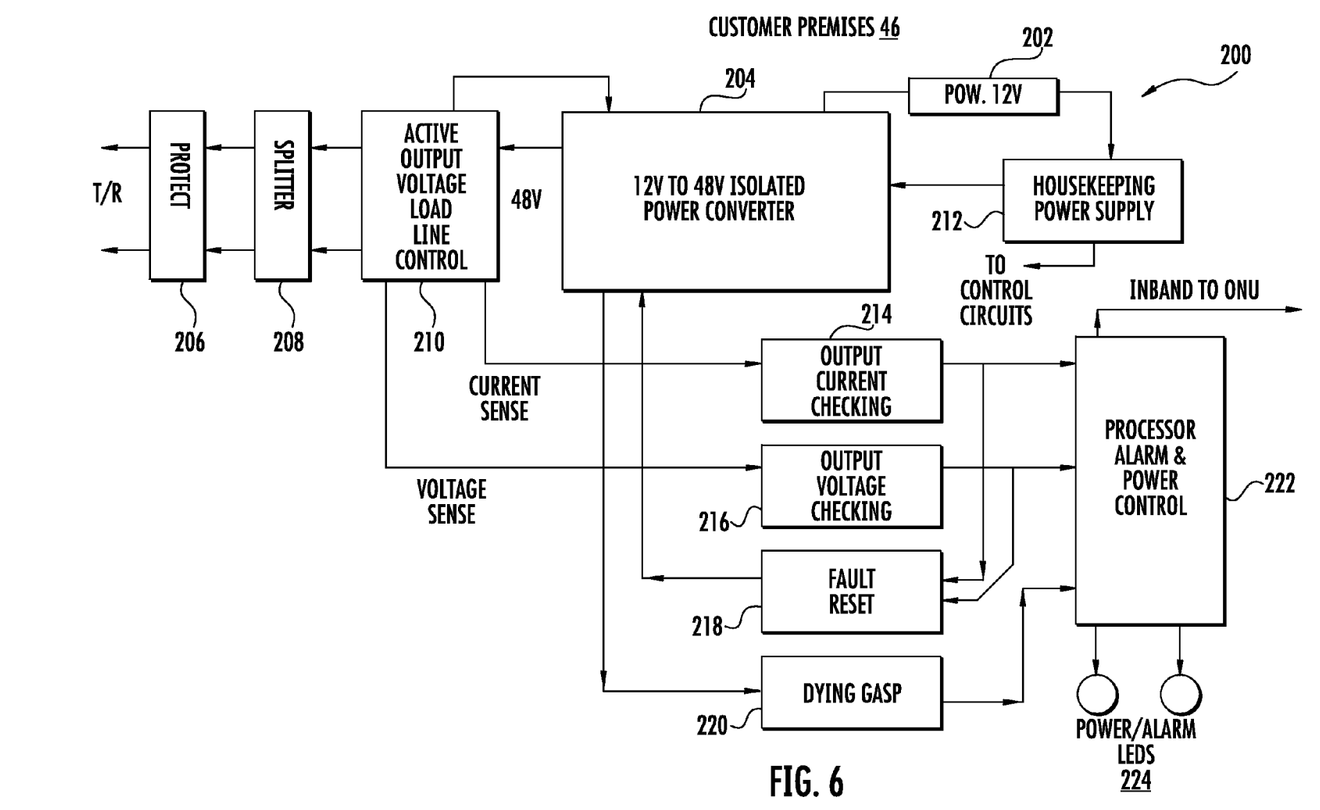
FIG. 6 is a block diagram of a reverse power supply circuit located at a customer premises as part of Customer Premises Equipment (CPE) in accordance with a non-limiting example.

FIG. 6 shows a customer premises equipment reverse power supply 200 located at a customer premises 46 and as used with the Total Reach Ethernet (TRE) system as supplied by ADTRAN, INC. of Huntsville, Ala. The reverse power supply 200 is powered from an external 12-volt supply 202 located at the customer premises. A 12-volt to 48-volt isolated power converter 204 provides an isolated 48 volts power to power the ONU. Specialized circuits on the CPE provide fault isolation, transient protection, improved current sharing between CPE devices on different length loops, galvanic isolation, and alarms. The reverse power supply includes circuits to allow robust transient protection on the tip/ring lines and fault reset operation to release a triggered protection device following a surge by shutting down the power converter and restarting it.

Various components as shown in FIG. 6 are now described.

The protection circuit 206 provides typical secondary protection for lightning and AC power-cross surges on the tip/ring interface. A splitter circuit 208 includes a splitter inductor to isolate the on-board power supply from the high-speed line data interface. The 12-volt to 48-volt converter features active output voltage load line control 210 to improve power sharing between the plurality of CPE. It establishes equitable power sharing between CPE reverse power supplies powering an ONU on different length lines by adjusting the output voltage as a function of load current. As noted before, the 12 to 48-volt isolated power converter circuit 204 generates the 48-volt output to power the ONU over a tip/ring (T/R) pair.

The housekeeping supply bias circuit 212 is typically a Transformer-isolated power supply that generates housekeeping voltages required by the power converter circuit and associated control circuits. The output current checking circuit 214 verifies the output current of the reverse power supply is operating in a proper load current condition. This circuit provides alarm outputs to the processor alarm and power control circuit for undercurrent and open-circuit loop conditions and overcurrent and short-circuit type loop conditions and to the fault reset circuit. The output voltage checking circuit 216 monitors the output voltage to verify it is within normal limits and provides alarm outputs for overvoltage and undervoltage conditions that are transmitted to a processor alarm and power control circuit. The fault reset circuit 218 is connected to the reverse power supply and configured to initiate a power down and power up sequence of a respective reverse power supply when the respective reverse power supply circuit is in a fault condition. This is established for a defined period of time. The reverse power supply is shut down for a defined period and restarted. This allows a transient protection device that triggers on surges on the tip/ring line to release by reducing output current to less than the holding current of the transient protection device. Without this, the transient protection device would remain in a triggered state and data and power would be lost indefinitely.

The dying gasp circuit 220 operates when the power input is removed from the CPE. This circuit provides an early warning of impending power loss to the processor at the CPE to allow the processor time to send a signal indicating CPE power removal as a notification to the ONU over the Ethernet link. This is forwarded to the alarm management 78 and EMS 74 to discriminate power faults from power removal at the CPE device. A processor alarm and power control 222 provides control and signals power and alarm LED's 224.

This reverse power supply as described enhances the current sharing of all the powered communications ports and reduces individual communication port operating costs. The system reduces individual supply maximum power requirements and allows loop fault detection by ensuring loop current on each individual powering pair independent of loop resistance differences. This allows the system to discriminate between an open wire pair, a shorted wire pair, and a good working wire pair to the ONU. The power management circuit on the ONU and reverse power supply circuit at the CPE as a management system controls service delivery and port activation to minimize power consumption of any unit and enable single port powering.

This power management circuit forms a system that minimizes power consumption and includes detection of power on an individual port to configure data flow through a switching element such as the Ethernet switch, thereby eliminating excess power consumption in the switch. It permits transmit power to a "chaining" SFP as controlled by a management processor to disable power to the SFP when it is not provisioned. It also allows transmit power to a "chaining" SFP to be disabled and periodically re-enabled for chaining SFP's that do not detect a receive signal. This allows power savings for the local ONU when the far end is not activated or connected. The microcontroller or main processor can be formed as a micropower RISC controller to monitor the ONU power consumption and allow management of the services based on available number of powering ports and power consumption.

The front-end circuit at each communication port includes a diode "OR" type power front-end circuit to isolate the individual port failures, port pair shorts, and allow normal operation when other communication ports are functional. The specialized transient protection is integrated into the power supply of the ONU to prevent transient events from shutting down the local power supply inadvertently when faults occur on individual ports. The reverse power supply design incorporates a "hiccup" power down-power up sequence to allow protection devices to be released and reset after transient port faults. This ONU power supply design maintains nominal output power when individual reverse powered communication ports are shut down and restarted during normal operation or during customer power down of the CPE device which is typically an optical network terminal (ONT) device.

There is a management power and environmental capability that tracks power consumption and environmental conditions via a management ULAN flow. The system allows messaging between a CPE and the ONU and allows communication of alarms and power failure indications on either end. These indications could be transmitted over a variety of protocols such as OMCI, SNMP, CLI, etc. The system communicates to an alarm head end service to allow tracking of power faults and alarms on different ports. An optional network express type power feed port can be provided for battery backed powering from a central office or remote exchange.

The system as described provides an alarm and management system to increase reliability of the system and allow better transient responses. The alarm features allow an early detection when the power is pulled, for example, from a modem at a customer premises. The system provides messages and messaging channels and informs the service provider the reason that a service went down, for example, at a modem or other location. The front-end power circuit as a diode bridge acts as a logical circuit to "or" power together. The reverse power supply as described as part of the CPE has an active output voltage load line control to improve load sharing across the ports and improve circuit functions, such as determining when a modem is shut down. The system improves the sharing and transient response, for example, when an individual shuts one of the ports down. The dying gasp ties into the alarm function and gives the ability for the system to determine that someone has unplugged the device. An interrupt can be created and the processor can send the message reflecting a turn off state.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. An optical communications system, comprising:
    a plurality of customer premises equipment (CPE) each having a reverse power supply circuit and each connected to a wire pair and configured to transmit and receive data and provide reverse power over the wire pair;
    an optical network unit (ONU) comprising a plurality of communication ports, wherein a respective communication port is connected to a selected wire pair and its associated CPE through which data is transmitted and received and power received therefrom, and further comprising a power management circuit connected to each of said communication ports and configured to receive power and provide power sharing and manage power consumption and power supply redundancy from the plurality of CPE through the communication ports.

2. The optical communications system according to claim 1, wherein each port at the ONU includes a front end power circuit connected to the power management circuit and configured to isolate individual port failures, port wire pair shorts and allow normal operating when other ports are functional.

3. The optical communications system according to claim 2, wherein each front end power circuit comprises a bridge circuit, protection circuit, and splitter.

4. The optical communications system according to claim 1, wherein each reverse power supply at a CPE includes a fault reset circuit connected to said reverse power supply and configured to initiate a power down and power up sequence of a respective reverse power supply when the respective reverse power supply circuit is in a fault condition.

5. The optical communications system according to claim 1, wherein each reverse power supply at a CPE includes a transient protection device which will activate during a transient on the tip and ring lines and release from a triggered state based on the initiation of the power down and power up sequence.

6. The optical communications system according to claim 1, wherein each reverse power supply at a CPE includes active output voltage load line control to enhance load sharing among a plurality of CPE.

7. The optical communications system according to claim 1, wherein said ONU includes an Ethernet switch connected to said plurality of ports, and said power management circuit further comprises a processor connected to said Ethernet switch and configured to switch power consumption from unused and out-of-service communication ports.

8. The optical communications system according to claim 7, wherein said processor is configured to receive a dying gasp interrupt indicative that power is failing on a reverse power supply at a CPE.

9. The optical communications system according to claim 8, and further comprising a manager circuit configured to receive a signal indicative that the processor received a dying gasp interrupt and discriminate CPE device faults from a removal of power initiated by a customer.

10. The optical communications system according to claim 1, wherein said ONU comprises an over-current protection circuit configured to control in-rush current from the reverse power supply at power up.

11. The optical communications system according to claim 1, wherein each reverse power supply at a CPE includes a power converter circuit configured to convert a supply voltage into an isolated power supply voltage to reverse power the ONU.

12. The optical communications system according to claim 1, and further comprising an input port physical device at the ONU, wherein said power management circuit at the ONU powers down said input port physical device on the ONU based on if backpower voltage is provided on the line to reduce power consumption at the ONU.

13. The optical communications system according to claim 1, wherein said power management circuit at the ONU discriminates using a dying gasp message sent from a CPE device whether a CPE port is out of service due to a device/physical pair failure or removal of power at the CPE device.

14. The optical communications system according to claim 1, wherein said power management circuit of said ONU will power down any input port physical devices that are not in service and unused network SFP when not in service to reduce both power consumption of the ONU and thermal heat generation in the ONU.

15. An optical network unit (ONU) comprising:
a plurality of communication ports, wherein each port is configured to connect to a wire pair and an associated CPE such that each communication port is connected to a respective different wire pair and associated CPE through which data is transmitted and received and power received therefrom;
a power management circuit connected to each of said communication ports and configured to receive power and provide power sharing and manage power consumption and power supply redundancy from the plurality of CPE through the communication port;
each port further comprising a front end power circuit connected to the power management circuit and configured to isolate individual port failures, port pair shorts and allow normal operating when other redundant ports are functional.

16. The ONU according to claim 15, wherein each front end power circuit comprises a bridge circuit, protection circuit, and splitter.

17. The ONU according to claim 15, and further comprising an Ethernet switch connected to said plurality of ports and said power management circuit further comprises a processor connected to said Ethernet switch and configured to switch power consumption from unused and out-of-service communication ports.

18. The ONU according to claim 17, wherein said processor is configured to receive a dying gasp interrupt indicative that power is failing on a reverse power supply at a CPE.

19. The ONU according to claim 17, wherein said processor is configured to generate a signal to a manager circuit indicative that it received a dying gasp interrupt to allow discrimination of CPE device faults from a removal of power at the CPE initiated by a customer.

20. The ONU according to claim 15, and further comprising an overcurrent protection circuit configured to control in-rush current from a reverse power supply at power up.

21. A power supply configured to be located at a customer premises and provide reverse power to an optical network unit (ONU), comprising:
a tip/ring interface configured to be connected to a wire pair;
a power converter circuit operatively connected to the tip/ring interface and configured to convert a supply voltage into an isolated power supply voltage to reverse power an ONU connected to the wire pair;
an active output voltage load line control to enhance load sharing between a plurality of CPE powering an ONU;
a splitter circuit connected to the tip/ring interface and configured to isolate power and data;
a dying gasp interrupt circuit configured to generate an interrupt indicative of an impending power down; and
a fault reset circuit configured to initiate a power down and power up sequence of a respective reverse power supply when the respective reverse power supply circuit is in a fault condition.

22. The power supply according to claim 21, and further comprising a transient protection device configured to release from a trigger state based on the initiation of the power down and power up sequence.

* * * * *